United States Patent [19]

Harrod

[11] Patent Number: 4,930,796
[45] Date of Patent: Jun. 5, 1990

[54] RIDING VEHICLE

[75] Inventor: Lawrence R. Harrod, Fort Wayne, Ind.

[73] Assignee: Kransco, San Francisco, Calif.

[21] Appl. No.: 226,141

[22] Filed: Jul. 29, 1988

[51] Int. Cl.$^5$ .............................................. B62M 29/00
[52] U.S. Cl. ................................. 280/87.021; 280/218
[58] Field of Search ............ 280/218, 87.01, 87.02 R, 280/87.04 R, 87.04 A, 87.04 B, 87.021, 87.041, 87.043, 18, 18.1

[56] References Cited

U.S. PATENT DOCUMENTS

| 210,435 | 12/1878 | Root | 280/62 |
|---|---|---|---|
| 1,247,801 | 11/1917 | Egge | 280/87.04 R |
| 1,485,834 | 3/1924 | Davis | 280/218 |
| 1,668,623 | 5/1928 | Avril | 280/218 |
| 3,059,943 | 10/1962 | Rich | 280/87.01 |
| 3,140,100 | 7/1964 | Nichols et al. | 280/87.04 R |
| 3,352,570 | 11/1967 | Cordrey | 280/87.02 R |
| 3,392,991 | 7/1968 | Ryan et al. | 280/282 |
| 3,663,038 | 5/1972 | Hendricks | 280/218 |
| 3,794,351 | 2/1974 | Cudmore | 280/204 |
| 3,807,760 | 4/1974 | Jordan | 280/218 |
| 4,028,761 | 6/1977 | Taylor | 280/18 |
| 4,029,329 | 6/1977 | Chambers | 280/87.02 R |
| 4,166,630 | 9/1979 | Sullivan et al. | 280/87.02 R |
| 4,200,304 | 4/1980 | Hwang | 280/218 |
| 4,230,331 | 10/1980 | Johnson | 280/218 |
| 4,526,390 | 7/1985 | Skolnik | 280/87.04 R |

FOREIGN PATENT DOCUMENTS 881450 11/1961 United Kingdom .

OTHER PUBLICATIONS

Nashville Diversified, Inc. Product Brochure (Copyright 1985), Nashville Diversified Inc., Product Brochure (undated).
Kransco Product Brochure (1987).
Wham-O Product Brochure (Copyright 1988).

Primary Examiner—David M. Mitchell
Attorney, Agent, or Firm—Kolisch, Hartwell & Dickinson

[57] ABSTRACT

An improved riding vehicle includes a frame having a substantially triangular form which includes a seat region thereon. The seat region includes a knee pocket formed along the longitudinal axis thereof which terminates in a foot ledge adjacent the rear of the vehicle.

9 Claims, 2 Drawing Sheets

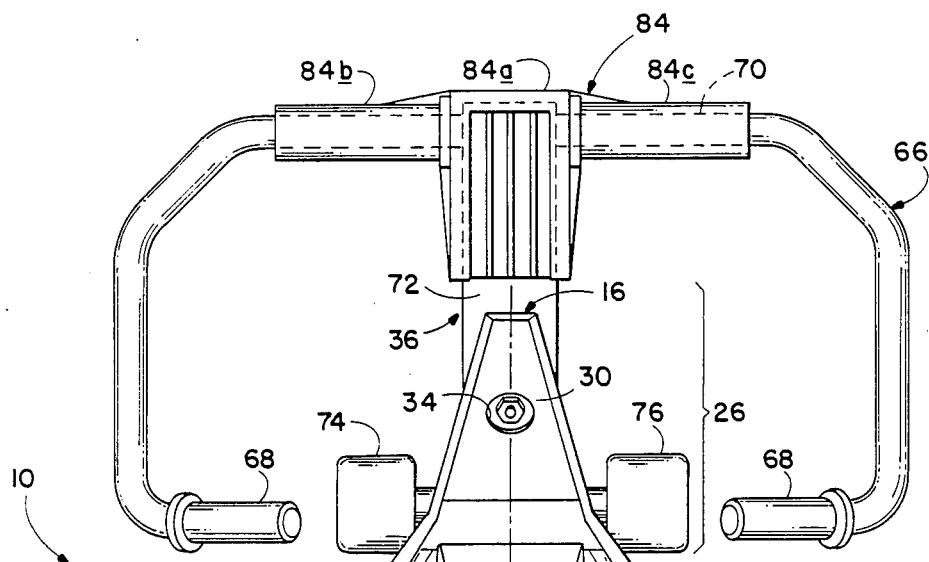
FIG. 1
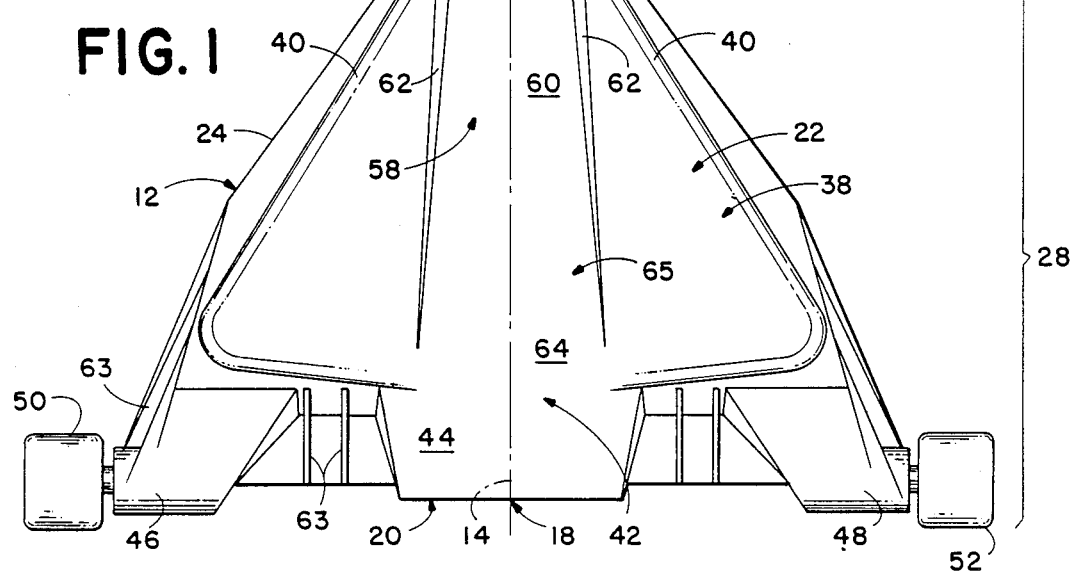
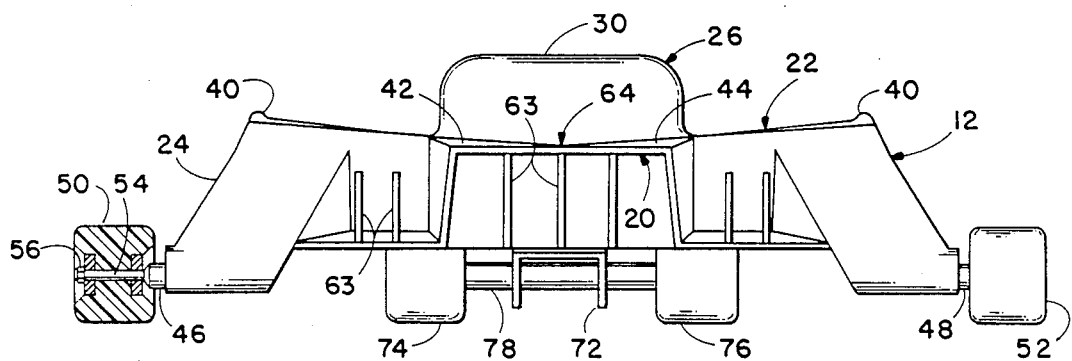
FIG. 3

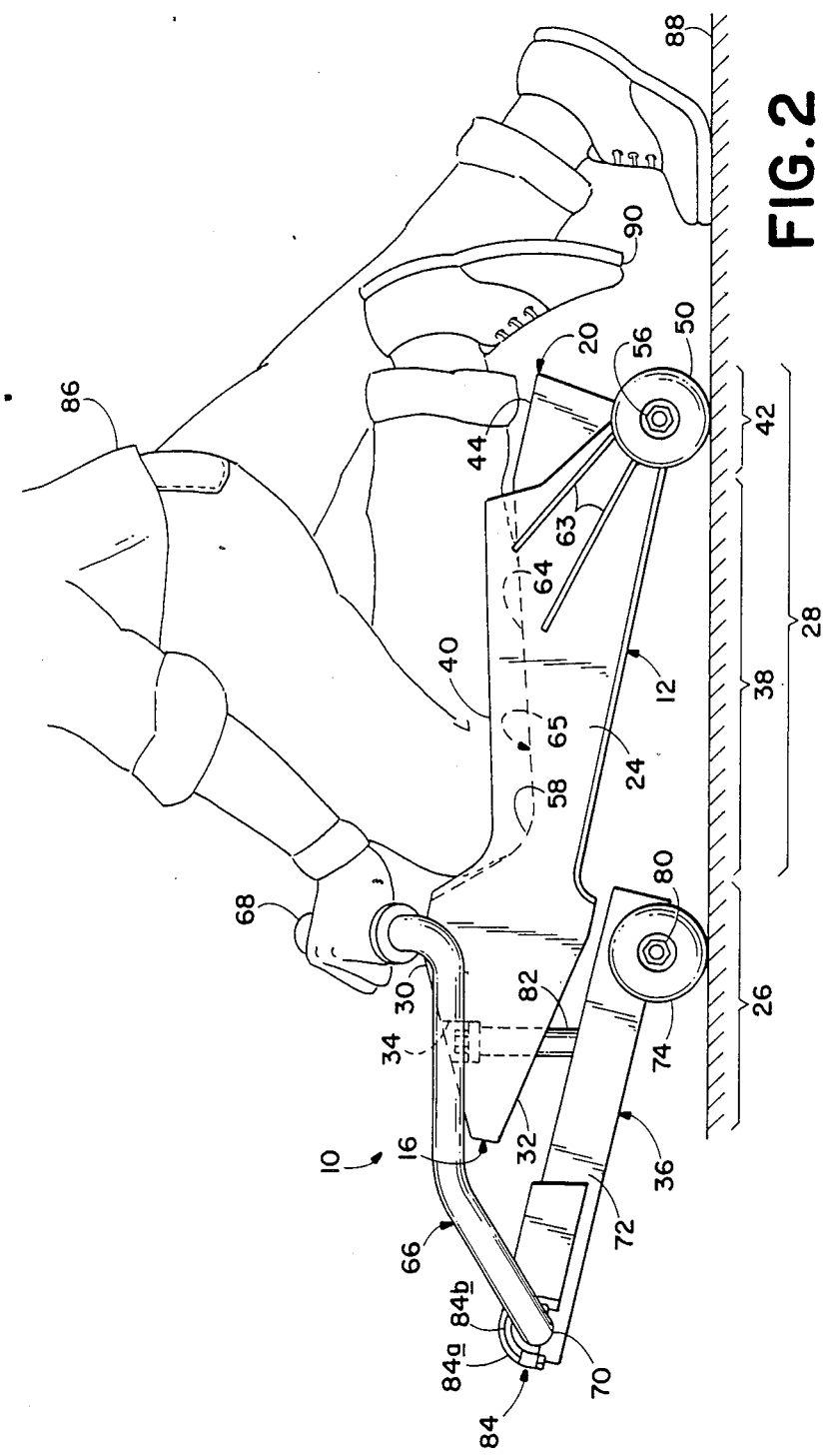

RIDING VEHICLE

BACKGROUND AND SUMMARY OF THE INVENTION

The present invention relates to riding vehicles, and specifically to a riding vehicle which may be ridden by sitting, kneeling or standing on the vehicle.

A variety of riding vehicles which incorporate roller skate type wheels are known. Perhaps the most familiar is the well known skate board. Another vehicle which utilizes roller skate wheels and a sitting platform is disclosed in U.S. Pat. Ser. No. 3,663,038 to Hendricks. This vehicle incorporates a steering mechanism wherein the steerable wheel is mounted aft of a pivot or wheel attachment point and which will provide a motive force to the vehicle by mere shifting of the wheel in a side-to-side motion.

An object of the present invention is to provide a vehicle which allows the rider to either sit, kneel or stand thereon.

Another object of the invention is to provide a vehicle which includes a knee pocket for receiving the knee and lower portion of a rider therein.

Yet another object of the invention is to provide a toy vehicle having a concave riding seat thereon.

A further object of the invention is to provide a vehicle which includes a foot ledge to allow the rider to stand thereon.

Another object of the invention is to provide a vehicle which includes a foot rest/bumper structure which is attachable on the handle bars thereof.

The vehicle of the invention includes a frame having a substantially triangular form which includes a seat region thereon. The seat region includes a knee pocket formed along the longitudinal axis thereof which terminates in a foot ledge adjacent the rear of the vehicle. A steering mechanism includes a handle bar and steerable wheels attached to the frame adjacent the apex of the triangle. Outwardly facing rear wheel mounts are located at the corners of the base of the triangle.

These and other objects and advantages of the invention will become more fully apparent as the description which follows is read in conjunction with the drawings.

BRIEF DESCRIPTION OF THE DRAWINGS

FIG. 1 is a top plan view of the vehicle constructed according to the invention.

FIG. 2 is a side plan view of the vehicle of FIG. 1 depicted with a rider kneeling on the vehicle.

FIG. 3 is a rear plan view of the frame of the vehicle, with portions broken away to show detail.

DETAILED DESCRIPTION OF THE PREFERRED EMBODIMENT

Referring to FIGS. 1-3, a vehicle constructed according to the invention is shown generally at 10. Vehicle 10 includes a frame 12 which has a substantially deltoideus shape and which, in the preferred embodiment, is constructed substantially in the form of an isosceles triangle. Frame 12 has a longitudinal axis 14 extending from the apex 16 of the frame to the midpoint 18 of the frame base 20.

Frame 20 includes an upper, rider-carrying surface 22 which is surrounded by a skirt 24. Skirt 24 extends about the periphery of frame 12 and depends downward from the rider-carrying surface.

Frame 12 is divided into a fore region 26 and a seat region 28. Fore region, also referred to herein as forward portion, 26 includes a gooseneck-like upper surface 30 and a downward slopping lower surface 32. The fore region also includes receiver means 34 for receiving a steering mechanism, shown generally at 36. Fore region 26 is also referred to herein as a forward narrowed segment.

Seat region 28 includes a central portion 38 which extends rearward from fore region 26. Central portion or segment 38 has an upper surface which has a concave cross section about longitudinal axis 14 with upwardly inclined surfaces extending laterally outwardly from axis 14. The central portion is surrounded by an upwardly extending ridge 40, which is an upward projection of skirt 24.

Seat region 28 also includes a rear portion or segment 42 which includes the area forming the base 20 of the frame and extends rearward from central portion 38. Rear portion 42 includes a foot ledge 44 which is located about longitudinal axis 14 and is formed adjacent the rear edge of frame 12. Wheel mounts 46, 48 for rear wheels 50, 52, respectively, are located on rear segment 42 adjacent what would be the base angles of the triangular form. The wheel mounts face outwardly from the frame of the vehicle at each of the rear corners of the frame and, in the preferred embodiment, have a spacing therebetween of about 45 cm. to 65 cm. The wheels are maintained on the wheel mounts by means of axles 54 which have a threaded end and nuts 56 which fit on the threads to maintain the wheels on the axles. This configuration is provided so that the wheels easily may be replaced with other wheels having different diameters or tractive properties.

A feature of the vehicle of the invention is the provision of a knee pocket 58 which extends from the rear of fore region 26 into the central region 38. The knee pocket is formed by a depressed area 60 in the central portion of the frame which is bounded on either side thereof by a ridge 62 which extends along the length of the pocket and extends from the depressed region up to the level of rider-carrying surface 22. Pocket 58 is operable to retard lateral shifting of a rider's knee on the frame.

A shin support 64 extends between knee pocket 58 and foot ledge 44. Knee pocket 58 and shin support 64 comprise what is referred to herein as a lower-leg receiving channel 65 which has, now referring to FIG. 2, a substantially S-shaped cross section along longitudinal axis 14. The channel is depressed below the level of the rider-carrying surface at the front end of the central segment and rises to the level of the rider-carrying surface adjacent the rear of the central portion. The knee pocket, shin support and foot ledge comprise a continuous structure which extends the length of the central and rear portions.

Frame 12 may be formed by a variety of processes, such as injection molding or casting. The frame is reinforced on the underside thereof by a rib arrangement (not shown) which provides stiffness yet allows flexing of the frame. Ribs 63 are provided at the base and sides of the frame to provide additional rigidity.

Steering mechanism 36 includes a handle bar 66 which, in the preferred embodiment, has a C-shape when viewed from the top of the vehicle. The handle bar includes hand grips 68 located at the free ends thereof and is fixed intermediate the ends, on the forward portion 70 thereof, by an elongate handle bar mount 72. Front wheel means, including wheels 74, 76 are rotatably mounted at the other end of handle bar mount 72 and, like wheels 50, 52 are of the roller skate type which are mounted on an axle 78 extending through the rear of the handle bar mount. The wheels are held on axle 78 by means of nuts 80.

Mechanism 36 includes an upwardly extending shaft 82 which is secured to the mount intermediate the ends thereof and is received in receiver means 34 to rotatably fix the steering mechanism to the frame. Shaft 82, also referred to herein as attachment means provides for pivoting of handle bar mount 72 and also allows wheels 74, 76 to caster with the directional movement of vehicle 10.

A T-shaped foot rest/bumper 84 is provided and is removably secured to handle bar 66 and handle bar mount 72 to provide a foot rest for a rider seated on the vehicle. A bumper portion 84a of foot rest 84 extends over the forward end of the handle bar mount to prevent damage to walls, furniture, etc., when the vehicle is operated indoors. A foot rest portion includes a pair of opposed rests 84b, 84c, which extends to either side of bumper portion 84a laterally over the handle bars. Rest-/bumper 84 may be clipped, by internal clips (not shown), to the handle bar and mount.

Referring now to FIG. 2, the rider 86 may kneel on the vehicle, as depicted, with the rider's lower-leg received in receiving channel 65. The frame is constructed such that the height of foot ledge 44 is sufficiently elevated from ground level 88 to provide clearance between the ground and the tip 90 of the rider's foot. The rider steers the vehicle by grasping grips 68 and propels the vehicle with the rider's free leg.

The rider may also sit on the vehicle with the rider's feet on foot rest 84. The vehicle may be propelled by shifting of steering mechanism alternately right and left, thus providing a propelling force as is described in U.S. Pat. Ser. No. 3,663,038.

The rider may also stand on the vehicle by placing one foot in channel 65, grasping grips 68 and propelling the vehicle with the free foot, or, the vehicle may be ridden as is a skate board, with one foot on the forward or central portion and the other foot on foot ledge 44. The vehicle may be steered by shifts in the rider's weight. The castering nature of the steering mechanism will allow the vehicle to follow a desired course.

Thus an improved vehicle has been disclosed which provides for a variety of riding positions. Although a preferred embodiment of the vehicle has been described, it should be appreciated that variations and modifications may be made thereto without departing from the scope of the invention.

It is claimed and desired to secure by Letters Patent:

1. An improved riding vehicle comprising:
a substantially deltoideus shaped frame having a longitudinal axis and including
a forward portion having a gooseneck-like upper surface and a downward sloping lower surface and including steering mechanism receiver means,
a central portion extending rearward from said forward portion, said central region portion including a seat region on an upper rider carrying surface having a seat with a concave cross section thereon, a knee pocket in the form of a depressed channel extending form said forward portion through said seat region along said longitudinal axis, said knee pocket being bounded on either side by said seat region with a ridge extending the length of said knee pocket between the levels of said depressed channel and said seat region, and
a rear portion comprising the base of the deltoideus form and having rear, laterally outwardly facing wheel mounts at each corner thereof, said rear portion further including a foot ledge located adjacent the rear of the frame; and
a steering mechanism including
a handle bar;
an elongate handle bar mount secured at one end thereof to said handle bar intermediate the ends thereof;
wheel mounts rotatably mounted at the other end of said handle bar mount; and
attachment means fixed to said handle bar mount intermediate the ends thereof and received in said receiver means for fixing said steering mechanism to said frame.

2. The vehicle of claim 1 wherein said foot ledge is constructed and arranged to provide, for a kneeling rider, clearance between the surface on which the vehicle is rolling and the tip of the rider's toe.

3. The vehicle of claim 1 wherein said knee pocket, shin support and ledge are contiguous and form a lower-leg receiving channel having a substantially S-shaped cross section.

4. The vehicle of claim 1 which further includes a foot rest/bumper structure removably secured to the steering mechanism and extending over the forward end of the handle bar mount and laterally over the handle bar along a portion thereof.

5. The vehicle of claim 1 wherein said rear wheel mounts are spaced apart from one another by a distance of about 45 cm. to 65 cm.

6. The vehicle of claim 1 wherein said frame provides support for a rider in a seating, kneeling or standing position, wherein said frame is constructed and arranged to provide footing for both of the rider's feet with the rider in a standing position.

7. In combination with a steering mechanism including a handle bar, an elongate handle bar mount secured at one end thereof to said handle bar intermediate the ends thereof, wheel means rotatably mounted at the other end of said handle bar mount, and attachment means fixed to said handle bar mount intermediate the ends thereof, an improved riding vehicle comprising:
a foot rest/bumper structure removably secured to the steering mechanism and extending over the forward end of the handle bar mount and laterally over the handle bar along a portion thereof; and
a frame having a substantially isosceles triangular form, including a longitudinal axis extending from the apex of the triangular form to the midpoint of the base, said frame having an upper, rider-carrying surface and a skirt extending about the periphery of said rider-carrying surface and depending downwardly therefrom, said rider-carrying surface including
a forward, narrowed segment having a gooseneck-like structure and means therein for receiving the steering mechanism;
a central segment extending rearward from said forward segment and having a concave cross section about said longitudinal axis; and
a rear segment including a foot ledge located about said longitudinal axis at the rear edge of said rear segment;

a lower-leg receiving channel having a substantially S-shaped cross section along said longitudinal axis being formed in said rider-carrying surface;

outwardly projecting wheel mounts disposed on said skirt adjacent the rear edge of said frame; and rear wheels, rotatably and removably secured to said wheel mounts.

8. The vehicle of claim 7 wherein said central segment and said rear segment comprise a rider's seat which includes an upwardly extending ridge at either side of said central segment, said ridge being an upward projection of said skirt extending along said central segment, and wherein said channel is depressed below the level of the rider-carrying surface at the front of said central segment and rises to the level of the rider-carrying surface adjacent the rear of said central segment.

9. The vehicle of claim 7 wherein said rear wheel mounts are spaced apart from one another by a distance of about 45 cm. to 65 cm.

* * * * *